(12) United States Patent
Cho

(10) Patent No.: US 9,040,188 B2
(45) Date of Patent: May 26, 2015

(54) JELLY ROLL AND ELECTRODE ASSEMBLY HAVING THE SAME

(75) Inventor: Ja-Hoon Cho, Yongin-si (KR)

(73) Assignee: Samsung SDI Co., Ltd., Giheung-gu, Yongin-si, Gyeonggi-do (KR)

( * ) Notice: Subject to any disclaimer, the term of this patent is extended or adjusted under 35 U.S.C. 154(b) by 408 days.

(21) Appl. No.: 13/152,542

(22) Filed: Jun. 3, 2011

(65) Prior Publication Data

US 2012/0045674 A1    Feb. 23, 2012

(30) Foreign Application Priority Data

Aug. 19, 2010    (KR) .................. 10-2010-0080290

(51) Int. Cl.

| | |
|---|---|
| H01M 4/00 | (2006.01) |
| H01M 6/10 | (2006.01) |
| H01M 2/14 | (2006.01) |
| H01M 2/18 | (2006.01) |
| H01M 10/16 | (2006.01) |
| H01M 4/64 | (2006.01) |
| H01M 4/72 | (2006.01) |
| H01M 2/16 | (2006.01) |
| H01M 2/26 | (2006.01) |
| H01M 10/04 | (2006.01) |
| H01M 10/0587 | (2010.01) |

(52) U.S. Cl.
CPC .......... *H01M 2/263* (2013.01); *H01M 10/0431* (2013.01); *H01M 10/0587* (2013.01)

(58) Field of Classification Search
USPC .......... 429/94, 129, 130, 131, 136, 208, 233, 429/246, 247, 248
See application file for complete search history.

(56) References Cited

U.S. PATENT DOCUMENTS 4,073,210 A *  2/1978  Totsu ........................... 411/404
4,539,272 A    9/1985  Goebel
(Continued)

FOREIGN PATENT DOCUMENTS

| CN | 101183735 A | 5/2008 |
| CN | 201397861 Y | 2/2010 |

(Continued)

OTHER PUBLICATIONS

Busby Metals (Standards Handbook Part 3 Terminology, 6th ed. 1968 REV 1975, Copper Development Association New York).*

(Continued)

*Primary Examiner* — Patrick Ryan
*Assistant Examiner* — Aaron Greso
(74) *Attorney, Agent, or Firm* — Robert E. Bushnell, Esq.

(57) ABSTRACT

Embodiments of the present invention facilitate a winding process and enable auxiliary current collectors to be securely fixed to a main current collector, thereby minimizing deformation during battery charging and discharging and maintaining sufficient strength. The jelly roll includes a first auxiliary current collector, a second auxiliary current collector, a mandrel insulating layer, and an electrode plate. The first auxiliary current collector and the second auxiliary current collector are spaced apart from each other and each has a mandrel protrusion on an opposite end portion. The mandrel insulating layer insulates the auxiliary current collectors from each other and insulates the auxiliary current collectors from an exterior. The electrode plate is formed by layering a separator, a first electrode plate, a separator and a second electrode plate and is wound on an external surface of the mandrel insulating layer.

18 Claims, 8 Drawing Sheets

(56) References Cited

U.S. PATENT DOCUMENTS

| | | | |
|---|---|---|---|
| 6,841,295 B2 | 1/2005 | Exnar | |
| 2003/0087150 A1* | 5/2003 | Chung | 429/129 |
| 2005/0287435 A1 | 12/2005 | Kim | |
| 2006/0035151 A1* | 2/2006 | Kumeuchi et al. | 429/231.1 |
| 2008/0076019 A1 | 3/2008 | Wu | |
| 2008/0113260 A1 | 5/2008 | Nansaka et al. | |
| 2008/0160418 A1* | 7/2008 | Pan et al. | 429/328 |
| 2011/0195286 A1 | 8/2011 | Aota et al. | |

FOREIGN PATENT DOCUMENTS

| | | | |
|---|---|---|---|
| DE | 102007000428 | 2/2009 | |
| DE | 102007000428 A1 * | 2/2009 | H01M 10/40 |
| JP | 2005-216825 A | 8/2005 | |
| JP | 2008-16411 A | 1/2008 | |
| JP | 2008-243411 A | 10/2008 | |
| JP | 4553751 B2 | 7/2010 | |
| JP | 2010146872 | 7/2010 | |
| JP | 2011-165437 A | 8/2011 | |
| KR | 10-2006-0033643 | 4/2006 | |
| KR | 10-2008-0010576 | 1/2008 | |
| KR | 10-0808093 | 2/2008 | |
| KR | 10-2008-0066314 | 7/2008 | |

OTHER PUBLICATIONS

AirCraftMaterialsUK (2001 {http://www.aircraftmaterialsuk.com/data/aluminium/1100.html}).*

Key to Metals Apr. 2009 {http://www.keytometals.com/p..aspx?ID=CheckArticle&site=ktn&Nm=216}.*

Korean Office Action issued by Korean Patent Office on Oct. 29, 2012 corresponding to Korean Patent Application No. 10-2010-0080290, and Request for Entry of the Accompanying Office Action attached herewith.

European Office Action issued on Dec. 6, 2011 in connection with European Patent Application Serial No. 11 178172, which also claims Korean Patent Application Serial No. 10-2010-0080290 as its priority document.

Chinese Office Action issued on Sep. 16, 2013 in the corresponding Chinese Patent Application No. 201110240041.4.

* cited by examiner

JELLY ROLL AND ELECTRODE ASSEMBLY HAVING THE SAME

CLAIM OF PRIORITY

This application makes reference to, incorporates the same herein, and claims all benefits accruing under 35 U.S.C. §119 from an application earlier filed in the Korean Intellectual Property Office on 19 Aug. 2010 and there duly assigned Serial No. 10-2010-0080290.

BACKGROUND OF THE INVENTION

1. Field of the Invention

One embodiment of the present invention relates to a jelly roll and an electrode assembly having the same, and more particularly, to a jelly roll which facilitates a process and has structural stability and an electrode assembly having the jelly roll.

2. Discussion of Related Art

A secondary battery is a chemical cell which may be repeatedly charged and discharged via reversible conversion between chemical energy and electrical energy. Recently, since telecommunication equipment is widely used and automotive batteries require a higher capacity and a higher output emerge, lithium secondary batteries having a higher voltage and a higher capacity density are required.

Although various materials may be used to form a battery, materials having a high charging and discharging capacity in a potential range for practical use is generally used in order to obtain a battery having a high capacity. Capacity may be classified into specific capacity that is a weight characteristic and capacity density that is a volume characteristic. A high quality battery generally has both a high specific capacity and a high capacity density and contains high-density materials.

Meanwhile, a lithium-ion secondary battery mainly includes a positive active material, a negative active material, an electrolyte, and a separator. The positive active material generally includes $LiCO_2$, and the negative active material generally includes carbon materials, such as graphite, occluding and emitting lithium as ions.

The above information disclosed in this Background section is only for enhancement of understanding of the background of the invention and therefore it may contain information that does not form the prior art that is already known in this country to a person of ordinary skill in the art.

SUMMARY OF THE INVENTION

An aspect of the present invention provides a jelly roll which is easy to be made by a winding process.

Another aspect of the present invention provides an electrode assembly including a terminal and a current collector and eliminating unnecessary space within the electrode assembly. The size of such electrode assembly may be advantageously minimized.

Still another aspect of the present invention provides an electrode assembly in which a jelly roll is securely settled during fabrication, and is thus physically stable after the completion of manufacture in order to minimize deformation occurring during charging and discharging and to have a strong structure against external impact.

In accordance with an embodiment of the present invention, a jelly roll may include a first auxiliary current collector, a second auxiliary current collector, a mandrel insulating layer, and an electrode plate. The first auxiliary current collector and the second auxiliary current collector are spaced apart from each other and each have a mandrel protrusion on a respective opposite end portion. The mandrel insulating layer insulates the auxiliary current collectors from each other and insulates the auxiliary current collectors from an exterior. The electrode plate is formed by layering a separator, a first electrode plate, a separator and a second electrode plate in sequence and the electrode plate may be wound on an outer surface of the mandrel insulating layer.

The first electrode plate includes a positive active material layer to which a positive active material is applied and a positive non-applied part to which the positive active material is not applied, and the second electrode plate includes a negative active material layer to which a negative active material is applied and a negative non-applied part to which the negative active material is not applied. Here, the electrode plates may be deposited with the positive non-applied part being exposed to one edge of the separator and the negative non-applied part being exposed to another opposite edge of the separator.

The first auxiliary current collector may include an alloy of at least one of aluminum, nickel, titanium and plastic carbon.

The second auxiliary current collector may include an alloy of at least one of copper, stainless steel, aluminum and nickel.

Two or more mandrel protrusions may be formed on each auxiliary current collector.

In accordance with another embodiment of the present invention, an electrode assembly may include a first auxiliary current collector, a second auxiliary current collector, a mandrel insulating layer, an electrode plate, a first main current collector, and a second main current collector.

The first auxiliary current collector and the second auxiliary current collector are spaced apart from each other and each have a mandrel protrusion on a respective opposite end portion. The mandrel insulating layer insulates the auxiliary current collectors from each other and insulates the auxiliary current collectors from an outside. The electrode plate is formed by layering a separator, a first electrode plate, a separator and a second electrode plate in sequence and the electrode plate is wound on an outer surface of the mandrel insulating layer. Each of the first and second main current collectors includes a side plate in which a mandrel protrusion accommodating hole to accommodate the mandrel protrusion is formed and a cap plate extending from an edge of the side plate in a perpendicular direction. An electrode terminal is formed on the cap plate. A current collector insulating part connects the cap plate of the first main current collector with the cap plate of the second main current collector.

Further, the first main current collector, the second main current collector, and the current collector insulating part may be simultaneously and integrally formed as a single body.

Further, the first electrode plate may include a positive active material layer to which a positive active material is applied and a positive non-applied part to which the positive active material is not applied, and the second electrode plate comprises a negative active material layer to which a negative active material is applied and a negative non-applied part to which the negative active material is not applied. Here, the electrode plates are deposited with the positive non-applied part being exposed to one edge of the separator and the negative non-applied part being exposed to another opposite edge of the separator.

In addition, an adhesive inlet injecting an adhesive may be formed in the side plate of the first main current collector and in the side plate of the second main current collector.

Further, an adhesive injected into the adhesive inlet may be electrically conductive. Also, the adhesive may adhere the first main current collector to the positive non-applied part and may adhere the second main current collector to the negative non-applied part.

The adhesive may adhere the first auxiliary current collector to the positive non-applied part and may adhere the second auxiliary current collector to the negative non-applied part.

Further, two or more mandrel protrusions may be formed on each auxiliary current collector.

In addition, at least one adhesive inlet may be provided between the mandrel protrusions.

A conductive adhesive may be injected into the adhesive inlet.

The mandrel protrusion accommodating hole and the mandrel protrusions inserted into the mandrel protrusion accommodating hole may be welded together.

As described above, according to embodiments of the present invention, an auxiliary current collector functioning as a mandrel in a winding process is provided to facilitate the winding process.

Moreover, unnecessary space may be eliminated in order to increase a total density of a secondary battery maximally, thereby manufacturing the batter with a high output.

In addition, an auxiliary current collector is securely fixed to a main current collector, so that deformation of a secondary battery is minimized in charging and discharging and sufficient strength is maintained when dropped.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE INVENTION

Figure 1:
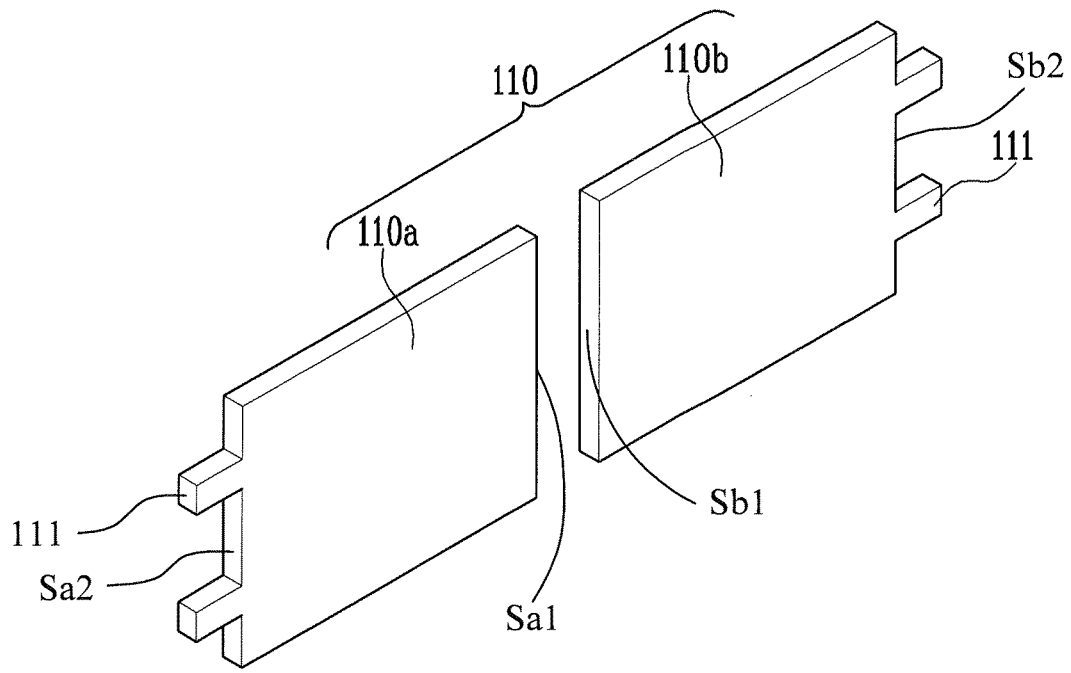
FIG. 1 is an oblique view illustrating an auxiliary current collector constructed as an embodiment.

In the following detailed description, only certain embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. In addition, when an element is referred to as being "on" another element, it can be directly on the other element or be indirectly on the other element with one or more intervening elements interposed therebetween. Also, when an element is referred to as being "connected to" another element, it can be directly connected to the other element or be indirectly connected to the other element with one or more intervening elements interposed therebetween. Hereinafter, like reference numerals refer to like elements.

Hereinafter, embodiments of the present invention will be described in detail with reference to the accompanying drawings. In the specification, terms to indicate directions "up," "down," "right," and "left" are based on directions in the drawings unless the context clearly indicates otherwise.

Figure 4A:
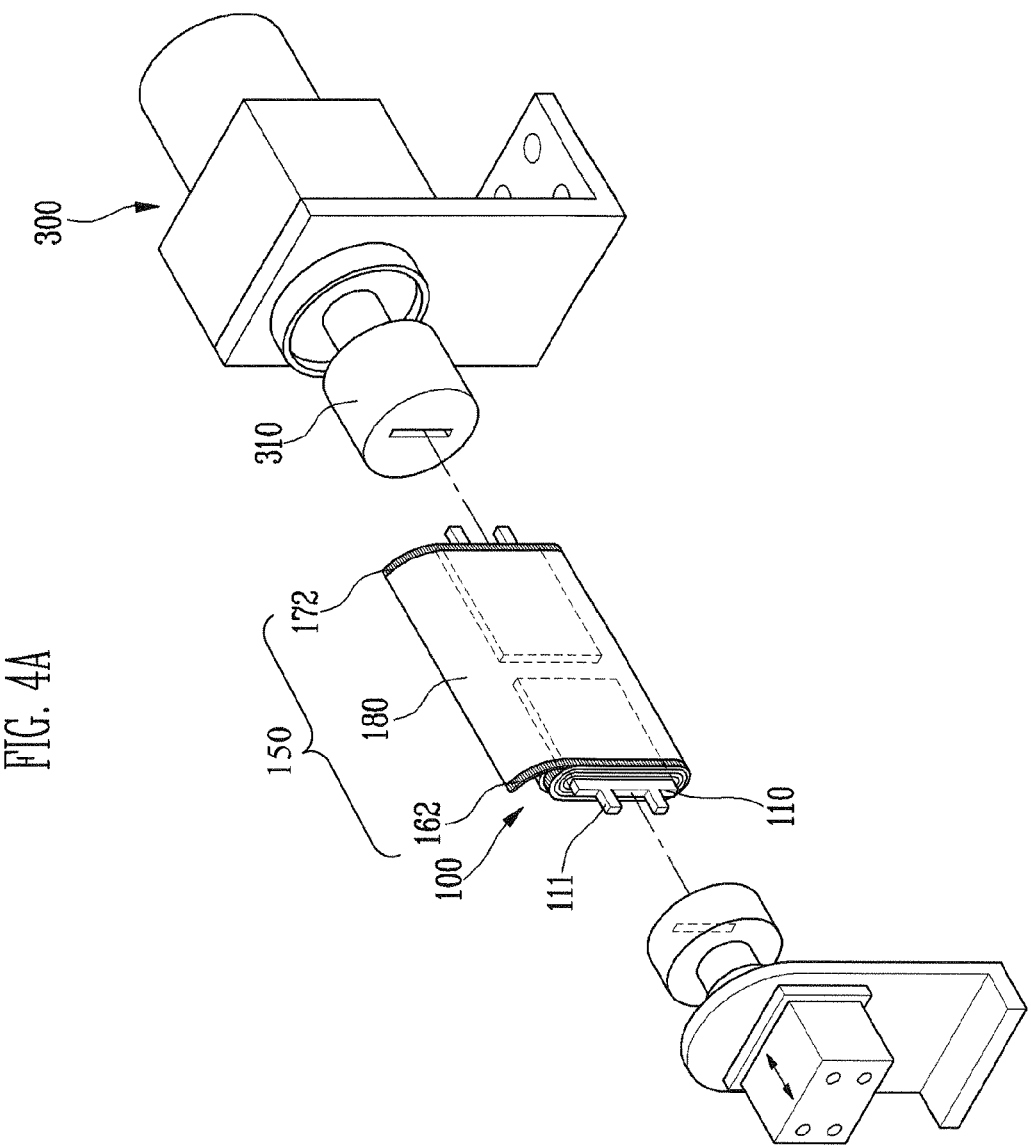
FIG. 4A is an oblique view illustrating winding a jelly roll according to an embodiment.
Figure 4B:
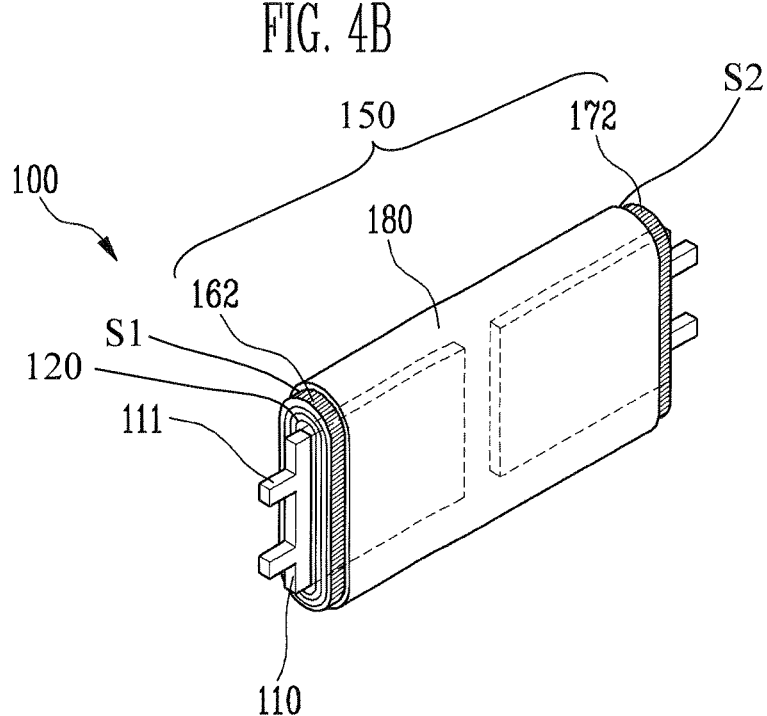
FIG. 4B is an oblique view illustrating a wound jelly roll constructed as an embodiment.
Figure 4C:
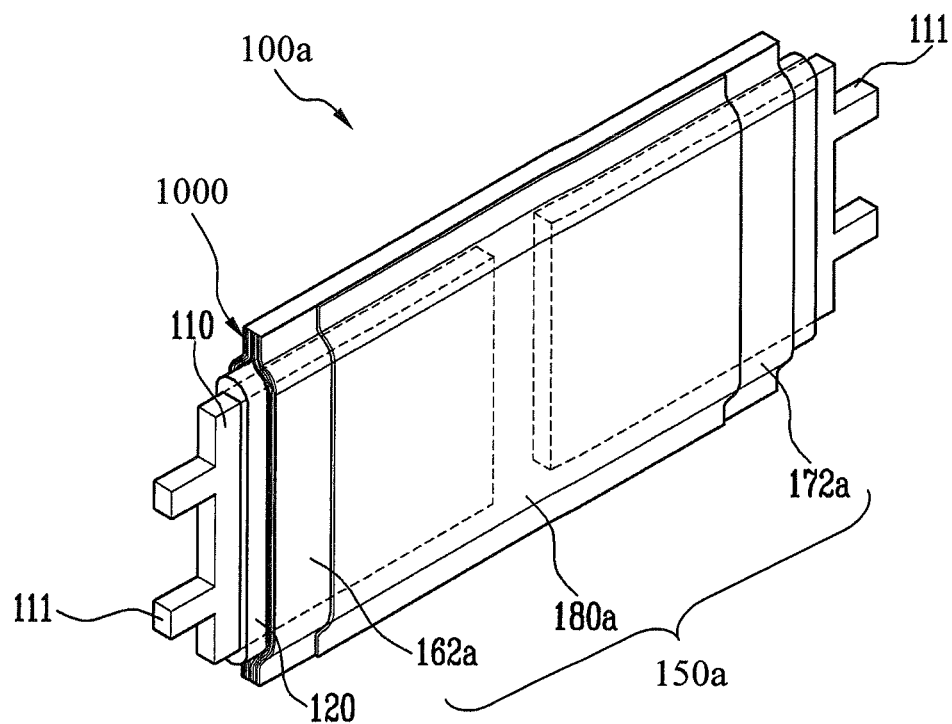
FIG. 4C is an oblique view illustrating a stack constructed as an embodiment.
Figure 5:
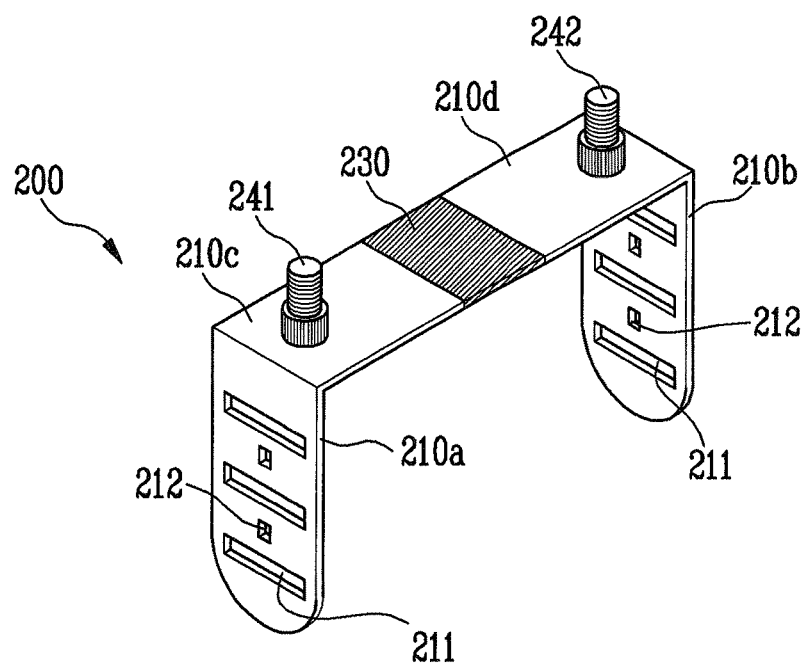
FIG. 5 is an oblique view illustrating a current collector constructed as an embodiment.
Figure 6:
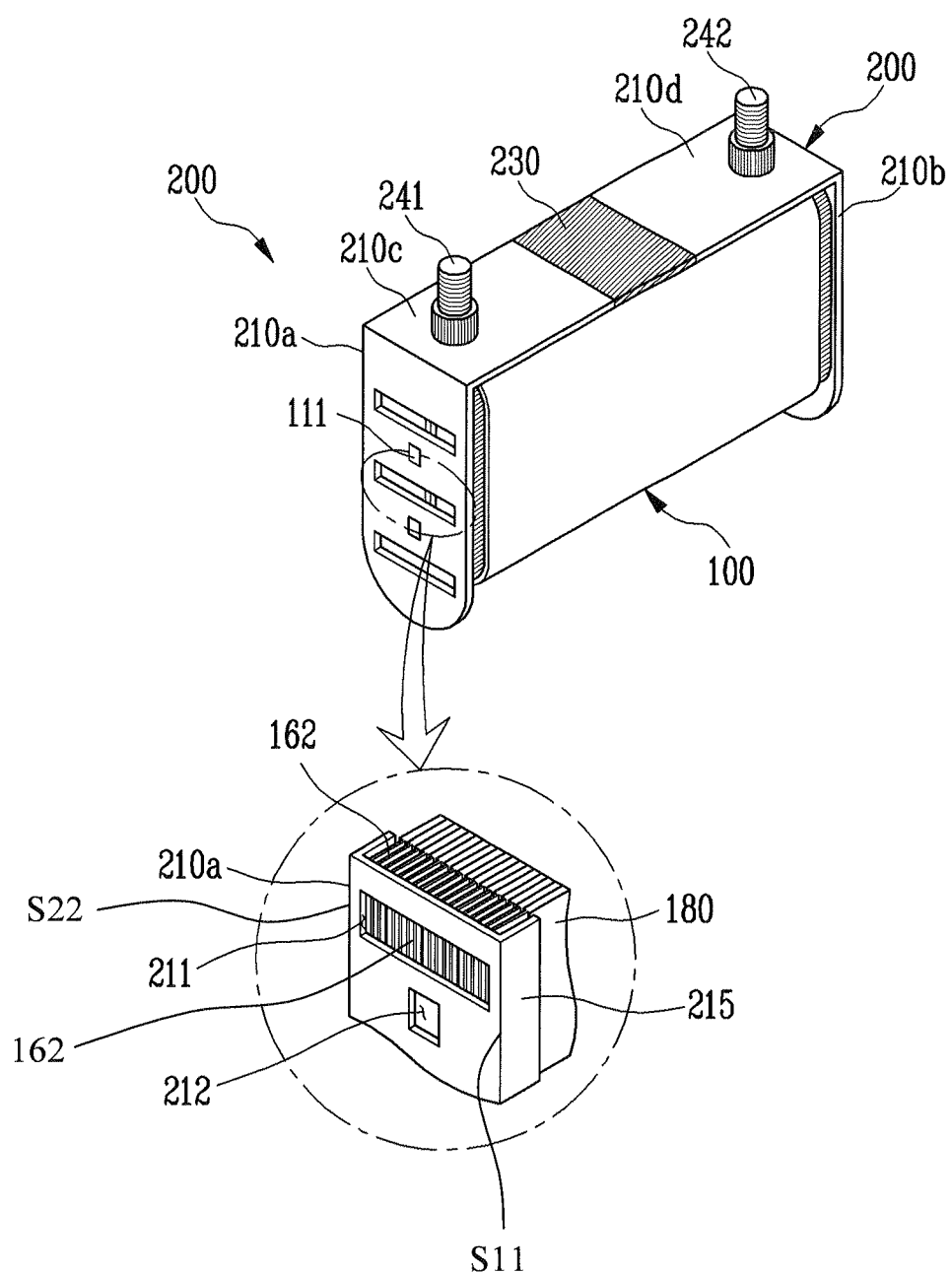
FIG. 6 is an oblique view illustrating a current collector and a jelly roll being connected.

An electrode assembly may include a jelly roll 100 and a current collector 200 as shown in FIGS. 4B, 5 and 6. In another embodiment, an electrode assembly may include a stack 100a and a current collector 200 as shown in FIGS. 4C, 5 and 6.

As shown in FIG. 4B, the jelly roll 100 may include an auxiliary current collector 110, a mandrel insulating layer 120, and an electrode plate 150.

As shown in FIG. 4C, the stack 100a may include an auxiliary current collector 110, a mandrel insulating layer 120, and a stacked type electrode plate 150a.

FIG. 1 is an oblique view illustrating an auxiliary current collector constructed as an embodiment. As shown in FIG. 1, the auxiliary current collector 110 includes a first auxiliary current collector 110a and a second auxiliary current collector 110b. In one embodiment, the first auxiliary current collector 110a may act as a positive auxiliary current collector, and the second auxiliary current collector 110b may act as a negative auxiliary current collector. In another embodiment, the first auxiliary current collector 110a may act as a negative auxiliary current collector, and the second auxiliary current collector 110b may act as a positive auxiliary current collector. For convenience of description, the first auxiliary current collector 110a is thereafter referred to as a positive auxiliary current collector, and the second auxiliary current collector 110b is thereafter referred to as a negative auxiliary current collector.

The positive auxiliary current collector 110a and the negative auxiliary current collector 110b may be formed in a rectangular plate shape. The positive auxiliary current collector 110a and the negative auxiliary current collector 110b may be disposed spaced apart from each other. In one embodiment, one side Sa1 of the positive auxiliary current collector 110a may be disposed to face toward one side Sb1 of the negative auxiliary current collector 110b, and the positive auxiliary current collector 110a may be aligned with the negative auxiliary current collector 110b in a same plane. A mandrel protrusion 111 is formed on an end portion Sa2 of the positive auxiliary current collector 110a opposite to the negative auxiliary current collector 110b, and another mandrel protrusion 111 is formed on an end portion Sb2 of the negative auxiliary current collector 110b disposed opposite to the positive auxiliary current collector 110a. In one embodiment, the mandrel protrusion 111 formed on the positive auxiliary current collector 110a protrudes away from the negative auxiliary current collector 110b; another mandrel protrusion 111 formed on the negative auxiliary current collector 110b protrudes away from the positive auxiliary current collector 110a. The mandrel protrusions 111 function as a mandrel when an electrode plate 150 is wound into a jelly roll (see FIG. 4A). In one embodiment, a pair of mandrel protrusions 111 may be formed on one side of each of auxiliary current collectors. Here, two or more mandrel protrusions 111 may be formed on a single auxiliary current collector so that the mandrel protrusions 111 may be settled securely in a winder 300 (see FIG. 4A).

The positive auxiliary current collector 110a may include aluminum (Al) or an aluminum alloy, and the negative auxiliary current collector 110b may include copper (Cu) or a copper alloy.

Figure 2:
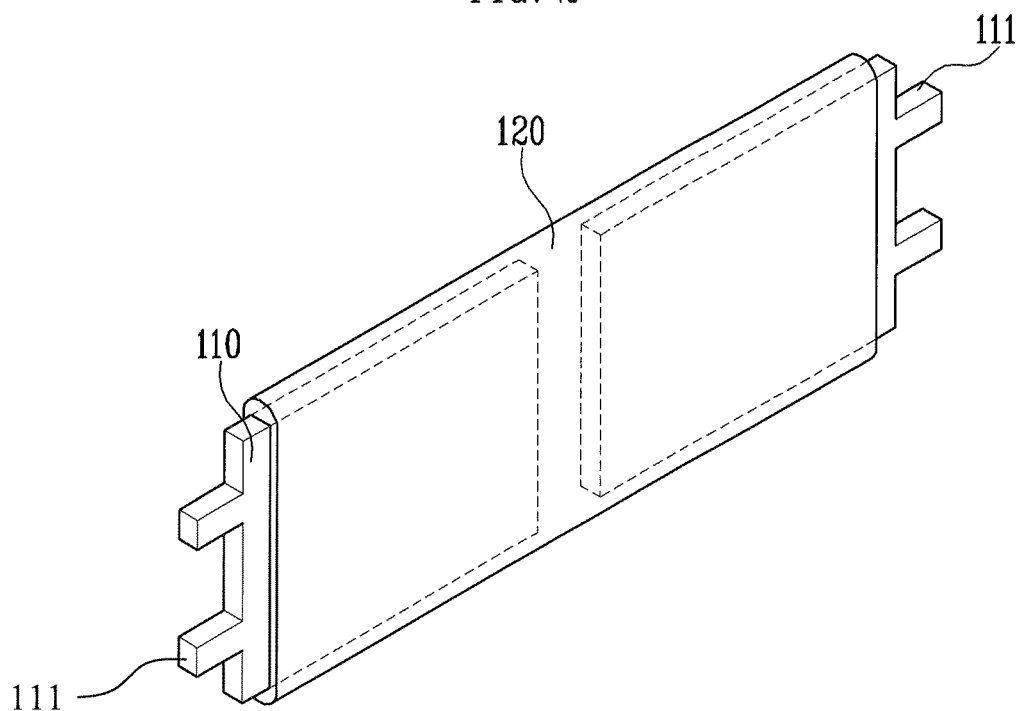
FIG. 2 is an oblique view illustrating an auxiliary current collector and a mandrel insulating layer constructed as the embodiment.

FIG. 2 is an oblique view illustrating an auxiliary current collector and a mandrel insulating layer constructed as the embodiment. As shown in FIG. 2, the mandrel insulating layer 120 includes an insulating material and may be formed via molding in order to encompass an outside of the auxiliary current collectors 110. The mandrel insulating layer 120 insulates the positive auxiliary current collector 110a and the negative auxiliary current collector 110b from each other, and insulates the auxiliary current collectors 110 from an electrode plate 150 which is wounded around the auxiliary current collectors 110. The mandrel insulating layer 120 may be formed by electrical insulating material.

Figure 3A:
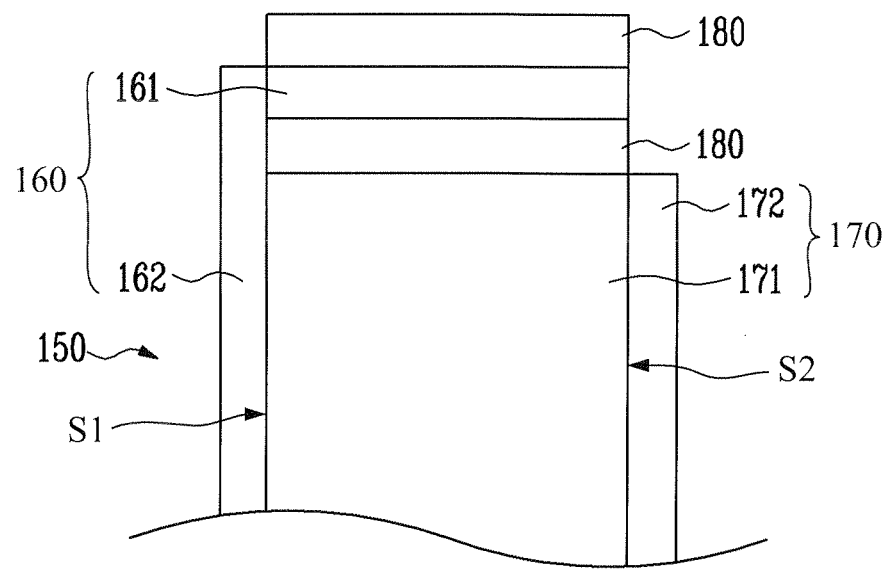
FIG. 3A is an exploded partial plan view illustrating an electrode plate.
Figure 3B:
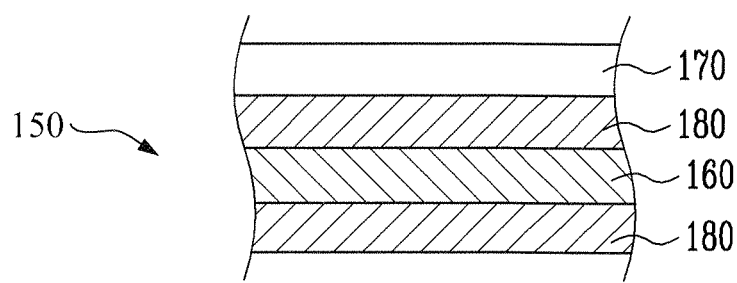
FIG. 3B is a partial cross-sectional view illustrating the electrode plate deposited.

Referring to FIGS. 3A and 3B, the electrode plate 150 is described. FIG. 3A is an exploded partial plan view illustrating the electrode plate, and FIG. 3B is a partial cross-sectional view illustrating the electrode plate. The electrode plate 150 includes a first electrode plate 160, a second electrode plate 170, and a separator 180. In one embodiment, the first electrode plate 160 may be a positive electrode plate, and the second electrode plate 170 may be a negative electrode plate. In another embodiment, the first electrode plate 160 may be a negative electrode plate, and the second electrode plate 170 may be a positive electrode plate. For convenience of description, the first electrode plate 160 is thereafter denoted as positive, and a second electrode plate 170 is thereafter denoted as negative.

The positive plate 160 includes a positive active material layer 161 in which a positive active material is applied to both surfaces or one surface of a positive current collector and a positive non-applied part 162 to which the positive active material is not applied. The positive current collector generally uses material having a high conductivity and a high chemical stability. For example, the positive current collector may include aluminum, nickel, titanium, plastic carbon, and the like. The positive active material layer 161 may be formed by applying slurry to the positive current collector, with the slurry being prepared by mixing a positive active material, a conductive material, and a binder with a solvent.

The negative plate 170 includes a negative active material layer 171 in which a negative active material is applied to both surfaces or one surface of a negative current collector and a negative non-applied part 172 to which the negative active material is not applied. The negative plate 170 may include conductive metal, for example, copper, stainless steel, aluminum, nickel, and the like. The negative active material layer 171 may be formed by applying slurry to a negative current collector, with the slurry being prepared by mixing a negative active material and a binder to improve coherence of the negative active material with a solvent.

The separator 180 may be interposed between the positive active material layer 161 and the negative active material layer 171. The separator 180 functions as a passage of ions and prevents a direct contact between the positive plate 160 and the negative plate 170. Thus, the separator 180 is formed of an insulating thin film having a high ion permeability and a high mechanical strength. In one embodiment, the separator 180 may be formed of an electrical insulating thin film. For example, the separator 180 may use a porous film including polyethylene, polypropylene or polyvinylidene fluoride, or felt.

An electrode assembly used for a secondary battery may be classified into a winding-type electrode assembly, a deposition-type electrode assembly, and the like. The winding-type electrode assembly is formed by winding a positive plate and a negative plate being insulated from each other by a separator, and the positive and negative plates are sheets extending longitudinally. In the winding-type electrode assembly, the capacity of a battery may be increased by increasing the number of windings. As the number of windings increases, however, the electrode plates or the separator which constitute the electrode assembly may be detached and be easily deformed. Furthermore, the positive plate may come into a direct contact with the negative plate, so that a short circuit may occur.

FIG. 3B shows a cross-sectional view of a layered structure of the electrode plate 150. As shown in FIG. 3B, the electrode plate 150 may be formed by layering the separator 180, the positive plate 160, the separator 180, and the negative plate 170 in order. Here, the positive plate 160, the separator 180, the negative plate 170, and the separator 180 may be layered in order, since the above layered structure is repeated in winding.

As described above, the positive plate 160 includes the positive active material layer 161 and the positive non-applied part 162, and the negative plate 170 includes the negative active material layer 171 and the negative non-applied part 172. When the positive plate 160 is deposited on the separator 180, the positive non-applied part 162 is exposed to one side (or edge) S1 of the separator 180. Likewise, when the negative plate 170 is deposited on the separator 180, the negative non-applied part 172 is exposed to another side (or edge) S2 of the separator 180. When the electrode plate 150 is wound, as shown in FIG. 4B, the positive non-applied part 162 is exposed to one side S1 of the separator 180, and the negative non-applied part 172 is exposed to the other side S2 of the separator 180. When the electrode plate 150 is wound into a jelly roll, in one embodiment, the positive non-applied part 162 is uncovered by the separator 180 and is exposed at one edge S1 of the separator 180; the negative non-applied part 172 is uncovered by the separator 180 and is exposed at an opposite edge S2 of the separator 180.

FIGS. 4A and 4B show a winding process. FIG. 4A is an oblique view illustrating a process of winding the jelly roll 100, and FIG. 4B is an oblique view the wound jelly roll 100.

The winder 300 is a device for winding the electrode plate 150 on an outside of the mandrel insulating layer 120. The winder 300 includes a mandrel protrusion fixing unit 310 to accommodate and settle the mandrel protrusions 111 on a rotation shaft of a sub-motor and performs a winding process. Here, the alignment of the positive plate 160, the separator 180, and the negative plate 170 is important, and thus winding is uniformly performed.

The auxiliary current collectors 110 may be wound in a situation where only the mandrel protrusions are exposed to the exterior of the jelly roll in view of risk of a short circuit.

FIG. 4C is an oblique view illustrating a stack constructed as another embodiment. As shown in FIG. 4C, a stack 100a may include an auxiliary current collector 110, a mandrel insulating layer 120, and a stacked type electrode plate 150a. The difference between FIG. 4B and FIG. 4C is that FIG. 4C shows a stacked type electrode plate 150a which is different from the jelly roll type electrode plate 150 of FIG. 4B. The stacked type electrode plate 150a is formed by stacking layers 1000. In the stacked type electrode plate 150a, the positive non-applied part 162a is uncovered by the separator 180a and is exposed at one edge of the separator 180a; the negative non-applied part 172a is uncovered by the separator 180a and is exposed at an opposite edge of the separator 180a.

FIG. 5 shows an oblique view of the current collector 200. A main current collector 210 collectively refers to a positive side plate 210a, a positive cap plate 210c, a negative side plate 210b, and a negative cap plate 210d. The main current collector 210 may be formed by bending one plate twice at a right angle. As shown in FIG. 5, two plates, i.e., the side plates 210a and 210b, face towards each other and are disposed opposite to each other. Two side plates 210a and 210b are physically connected by the cap plates 210c and 210d, and the two side plates 210a and 210b are electrically insulated from each other by a current collector insulating part 230. The current collector insulating part 230 may be provided between the two cap plates 210c and 210d in order to electrically insulate the cap plate 210c from the cap plate 210d. Here, the side plates 210a and 210b, the cap plates 210c and 210d, and the current collector insulating part 230 may be simultaneously and integrally formed as a single body via double injection molding, or may be manufactured separately and combined via soldering or welding.

A mandrel protrusion accommodating hole 212 is formed in the side plates 210a and 210b. The mandrel protrusion accommodating hole 212 may be a through hole. The mandrel protrusions 111 formed on the auxiliary current collectors 110a and 110b may be inserted into the mandrel protrusion accommodating hole 212. Further, an adhesive inlet 211 may be formed in the side plates 210a and 210b. The adhesive inlet 211 may be a through hole. In one embodiment, adhesive inlet 211 may be disposed separately from the mandrel protrusion accommodating hole 212. When the wound jelly roll 100 is put into the current collector 200, an adhesive may be injected through the adhesive inlet 211 and the adhesive may be disposed to fill a gap between the wound jelly roll 100 and the current collector 200. Here, the adhesive inlet 211 may be formed between at least two of the mandrel protrusion accommodating holes 212. When an electrically conductive adhesive is injected through the adhesive inlet 211 provided between the mandrel protrusion accommodating holes 212, the conductive adhesive may reach up to the auxiliary current collectors 110. Here, the side plates 210a and 210b and the cap plates 210c and 210d may be formed of the same material as the auxiliary current collectors 110.

Referring to FIG. 6, a process of connecting the jelly roll 100 to the current collector 200 is described. FIG. 6 is a perspective view illustrating an assembly where the jelly roll 100 and the current collector 200 are connected to each other. The two mandrel protrusions 111 of the jelly roll 100 may be inserted into the mandrel protrusion accommodating holes 212 formed in the side plates 210a and 210b of the current collector 200, so that the jelly roll 100 and the current collector 200 are connected. Here, a jelly roll guide 215 may be provided to guide the inserted jelly roll 100 and to prevent detachment of the positive and negative non-applied parts 162 and 172 formed on opposite sides of the jelly roll 100 after the jelly roll 100 is connected. The jelly roll guide 215 extends from opposite sides (or edges) S11 and S22 of the side plates 210a and 210b toward a direction along the extending direction of the cap plates 210c and 210d.

When the connection between the jelly roll 100 and the current collector 200 is completed, as shown in FIG. 6, the inside positive or negative non-applied part 162 and 172 may be seen through the adhesive inlet 211, and the mandrel protrusions 111 inserted from the inside may be seen through the mandrel protrusion accommodating holes 212. The electrode terminals 241 and 242 are designed to be electrically connected to external electrical devices.

Figure 7:
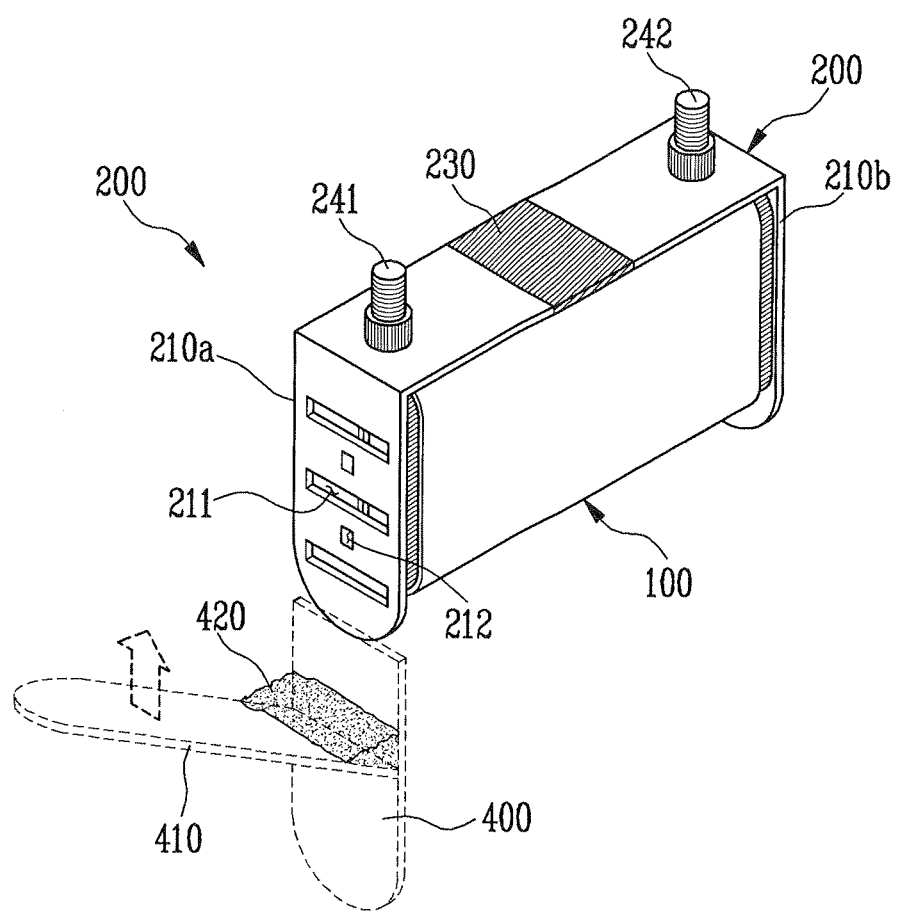
FIG. 7 is a schematic view illustrating a process of applying an adhesive.

Referring to FIG. 7, a process of applying an adhesive is described. FIG. 7 is a schematic view illustrating the process of applying the adhesive. First, an auxiliary side plate 400 is provided parallel with one of the side plates 210a and 210b side by side. Then, a predetermined amount of an adhesive 420 is applied onto the auxiliary side plate 400, and the adhesive 420 is spread on up to the side plates 210a and 210b using a blade 410. In this manner, the adhesive 420 is put onto the jelly roll 100 through the mandrel protrusion accommodating holes 212 and the adhesive inlet 211.

Here, the adhesive 420 may be an electrically conductive adhesive. The adhesive 420 may attach or adhere the positive side plate 210a to the positive non-applied part 162, and attach or adhere the negative side plate 210b to the negative non-applied part 172. Separately or simultaneously, the adhesive 420 may attach or adhere the positive auxiliary current collector 110a to the positive non-applied part 162 and attach or adhere the negative auxiliary current collector 110b to the negative non-applied part 172.

In one embodiment where the adhesive 420 is not electrically conductive, a conductive connection member may be additionally provided to respectively electrically connect the non-applied parts 162 and 172 of the electrode plate 150 with the auxiliary current collectors 110a and 110b or to respectively electrically connect the non-applied parts 162 and 172 of the electrode plate 150 with the side plates 210a and 210b.

After applying the conductive adhesive 420, the conductive adhesive 420 is heated via ultraviolet irradiation or the like so as not to damage a separator of a secondary battery and then the conductive adhesive 420 is hardened at a low temperature.

Here, in order to improve connection of the jelly roll 100 and the current collector 200, the mandrel protrusion accommodating holes 212 and the mandrel protrusions 111 inserted into the mandrel protrusion accommodating holes 212 are welded before injecting the adhesive 420.

Although the spirit of the present invention was described in detail in accordance with the embodiment, it should be understood that the embodiments are provide to explain the present invention and do not limit the present invention, and various jelly rolls and electrode assemblies having the same may be realized without departing from the scope of the present invention.

While the present invention has been described in connection with certain embodiments, it is to be understood that the invention is not limited to the disclosed embodiments, but, on the contrary, is intended to cover various modifications and equivalent arrangements included within the spirit and scope of the appended claims, and equivalents thereof.

What is claimed is:

1. A jelly roll, comprising:
a first auxiliary current collector and a second auxiliary current collector, the first auxiliary current collector comprising a first main body formed in a rectangular plate shape and a first mandrel protrusion which is disposed on a first end portion of the first main body and shares same two opposite planar surfaces with the first main body, and the second auxiliary current collector comprising a second main body formed in the rectangular plate shape and a second mandrel protrusion which is disposed on a second end portion of the second main body and shares same two opposite planar surfaces with the second main body, the first mandrel protrusion formed simultaneously together with the first auxiliary current collector as a single integral and monolithic structure and the second mandrel protrusion formed simultaneously together with the second auxiliary current collector as a single integral and monolithic structure, and the first and second first mandrel protrusions protruding away from each other;

a mandrel insulating layer electrically insulating the first auxiliary current collector from the second auxiliary current collector and the mandrel insulating layer insulating the first and second auxiliary current collectors from an exterior of the first and second auxiliary current collectors; and an electrode plate comprising a first electrode plate, a second electrode plate and a separator interposed between the first and second electrode plate in order to electrically insulate the first electrode plate from the second electrode plate, and the electrode plate being disposed on an outside surface of the mandrel insulating layer, with the first auxiliary current collector and the second auxiliary current collector wound with the electrode plate so that the mandrel protrusions are exposed to an exterior of the jelly roll.

2. The jelly roll of claim 1, wherein the first electrode plate comprises a positive active material layer to which a positive active material is applied and a positive non-applied part to which the positive active material is not applied, the second electrode plate comprises a negative active material layer to which a negative active material is applied and a negative non-applied part to which the negative active material is not applied, and the first and second electrode plates are disposed with the positive non-applied part being exposed to one edge of the separator and the negative non-applied part being exposed to another opposite edge of the separator.

3. The jelly roll of claim 2, wherein the first auxiliary current collector comprises an alloy of at least one of aluminum, nickel, titanium and plastic carbon.

4. The jelly roll of claim 2, wherein the second auxiliary current collector comprises an alloy of at least one of copper, stainless steel, aluminum and nickel.

5. The jelly roll of claim 1, wherein two or more mandrel protrusions are formed on each of the first and second auxiliary current collectors.

6. The jelly roll of claim 1, wherein the first auxiliary current collector and the second auxiliary current collector are disposed spaced apart from each other.

7. An electrode assembly, comprising:

a first auxiliary current collector and a second electrical auxiliary current collector, the first auxiliary current collector comprising a first main body formed in a rectangular plate shape and a first mandrel protrusion which is disposed on a first end portion and shares same two opposite planar surfaces with the first main body, the second auxiliary current collector comprising a second main body formed in a rectangular plate shape and a second mandrel protrusion which is disposed on a longitudinally opposite second end portion and shares same two opposite planar surfaces with the second main body, the first mandrel protrusion formed simultaneously together with the first auxiliary current collector as a single integral and monolithic structure and the second mandrel protrusion formed simultaneously together with the second auxiliary current collector as a single integral and monolithic structure, and the first and second first mandrel protrusions extending away from each other;

a mandrel insulating layer electrically insulating the first auxiliary current collector from the second auxiliary current collector and insulating the first and second auxiliary current collectors from an exterior of the first and second auxiliary current collectors;

an electrode plate comprising a first electrode plate, a second electrode plate and a separator interposed between the first and second electrode plates in order to electrically insulate the first electrode plate from the second electrode plate, and the electrode plate being wound on a circumferential surface of the mandrel insulating layer;

a first main current collector and a second main current collector each comprising a side plate and a cap plate perpendicularly extending from an edge of the side plate, the side plate including a mandrel protrusion accommodating hole accommodating each of the mandrel protrusions, and the cap plate comprising an electrode terminal; and a current collector insulating part physically connecting the cap plate of the first main current collector with the cap plate of the second main current collector, and electrically insulating the first main current collector from the second main current collector, with the first auxiliary current collector and the second auxiliary current collector wound with the electrode plate so that the mandrel protrusions are exposed to an exterior of a jelly roll formed by the first and second auxiliary current collectors and the electrode plate.

8. The electrode assembly of claim 7, wherein the first main current collector, the second main current collector, and the current collector insulating part are simultaneously and integrally formed as a single body.

9. The electrode assembly of claim 7, wherein the first electrode plate comprises a positive active material layer to which a positive active material is applied and a positive non-applied part to which the positive active material is not applied, the second electrode plate comprises a negative active material layer to which a negative active material is applied and a negative non-applied part to which the negative active material is not applied, and the electrode plates are disposed with the positive non-applied part being exposed to one edge of the separator and the negative non-applied part being exposed to another opposite edge of the separator.

10. The electrode assembly of claim 9, wherein an adhesive inlet injecting an adhesive is formed in the side plate of the first main current collector and in the side plate of the second main current collector.

11. The electrode assembly of claim 10, wherein the adhesive injected into the adhesive inlet is electrically conductive.

12. The electrode assembly of claim 10, wherein the adhesive adheres the first main current collector to the positive non-applied part and adheres the second main current collector to the negative non-applied part.

13. The electrode assembly of claim 12, wherein the adhesive adheres the first auxiliary current collector to the positive non-applied part and adheres the second auxiliary current collector to the negative non-applied part.

14. The electrode assembly of claim 10, wherein two or more mandrel protrusions are formed on each of the first and second auxiliary current collectors.

15. The electrode assembly of claim 7, wherein at least one adhesive inlet is provided between the mandrel protrusions.

16. The electrode assembly of claim 15, wherein an electrically conductive adhesive is injected into the adhesive inlet.

17. The electrode assembly of claim 9, wherein the mandrel protrusion accommodating hole and the mandrel protrusions inserted into the mandrel protrusion accommodating hole are welded together.

18. The electrode assembly of claim 7, wherein the mandrel insulating layer maintains the first auxiliary current collector and the second auxiliary current collector spaced apart from each other.

\* \* \* \* \*